US008443508B2

(12) United States Patent
Vogel et al.

(10) Patent No.: US 8,443,508 B2
(45) Date of Patent: *May 21, 2013

(54) COMPOUND TOOL WITH SCREWDRIVER ATTACHMENT

(75) Inventors: Ron Vogel, Camarillo, CA (US); Garrick Sillers, Thousand Oaks, CA (US)

(73) Assignee: T3 Innovation LLC, Camarillo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/550,326

(22) Filed: Jul. 16, 2012

(65) Prior Publication Data

US 2012/0279045 A1 Nov. 8, 2012

Related U.S. Application Data

(63) Continuation of application No. 12/479,618, filed on Jun. 5, 2009, now Pat. No. 8,220,135.

(51) Int. Cl.
*B23P 23/00* (2006.01)
*H01R 43/042* (2006.01)

(52) U.S. Cl.
USPC ................ 29/566.4; 29/750; 81/438; 81/439; 279/144; 279/89; 7/108; 7/901

(58) Field of Classification Search
USPC .................... 81/438, 439, 437; 279/144, 143, 279/89, 93, 79; 7/107, 108, 168, 901; 29/566.4, 29/33 M, 750, 758, 270, 278
See application file for complete search history.

(56) References Cited

U.S. PATENT DOCUMENTS

| | | | |
|---|---|---|---|
| 2,937,669 | A | 5/1960 | Lemke |
| 3,843,143 | A | 10/1974 | Laxson |
| 3,883,316 | A | 5/1975 | Mason |
| 4,161,061 | A | 7/1979 | Mason et al. |
| 4,241,496 | A | 12/1980 | Gregson |
| 5,175,921 | A | 1/1993 | Krietzman |
| 5,195,230 | A | 3/1993 | Krietzman |
| 5,604,948 | A | 2/1997 | McMahon et al. |
| 5,813,109 | A | 9/1998 | Ziegler et al. |
| 6,351,865 | B1 | 3/2002 | De Donato |
| 6,615,480 | B1 | 9/2003 | Murphy |
| 6,625,867 | B2 | 9/2003 | Jonker |
| 6,874,791 | B2 | 4/2005 | Chen et al. |

(Continued)

OTHER PUBLICATIONS

TelephoneStuff.com, Fluke Networks Adapter Blade, Model #10051-300, accessed on May 21, 2010, http://www.telephonestuff.com/catalog/model_10051-300.htm?popup=1 (admitted prior art).

*Primary Examiner* — Erica E Cadugan
(74) *Attorney, Agent, or Firm* — SoCal IP Law Group LLP; Steven C. Sereboff

(57) ABSTRACT

A punch down tool, a receiver for a punch down tool, and a work end adapter for a punch down tool, for terminating electrical conductors and turning fasteners, are disclosed. The work end adapter is adapted to receive standard tool bits and standard finned shaft tips. The punch down tool is adapted to receive standard blades and to receive the work end adapter. When installed in the punch down tool, the work end adapter rotates only with the punch down tool, and will not rotate independently of the punch down tool. The punch down tool has an impact mechanism and a lock-out button to prevent the tool's impact mechanism from operating.

20 Claims, 5 Drawing Sheets

U.S. PATENT DOCUMENTS

| | | | | |
|---|---|---|---|---|
| 7,225,490 | B1 | 6/2007 | Yen | |
| 7,621,040 | B2 | 11/2009 | Sullivan | |
| 7,788,788 | B2 | 9/2010 | Sullivan | |
| 2005/0092141 | A1 * | 5/2005 | Cho | 81/438 |
| 2006/0107801 | A1 * | 5/2006 | Hsien | 81/438 |
| 2007/0044596 | A1 | 3/2007 | Chen | |

* cited by examiner

| |
|---|
| Hammer Assembly for Delivering an Impact to the Receiver |

FIG. 4

FIG. 5
Receiver 300 including a Magnet

COMPOUND TOOL WITH SCREWDRIVER ATTACHMENT

RELATED APPLICATION INFORMATION

This patent is a continuation of application Ser. No. 12/479,618 filed Jun. 5, 2009, now U.S. Pat. No. 8,220,135, which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to compound tools with screwdriver attachments.

2. Description of the Related Art

Telephone linemen have long employed impact termination tools for installing and terminating electrical conductors at terminal blocks of telecom equipment installations. These tools are commonly referred to as punch down tools. Punch down tools have a stiff, strong handle to which a blade is attached. Blades are typically double-ended, and the handle has a longitudinal bore in a forward end into which a blade drops. The handle and blades mate so that the blade will stay in place during use. The blades have a tip which conforms with the shape of the terminals on the terminal block. Some blades include a cutting edge so that the wire is simultaneously inserted and trimmed.

To use the punch down tool, a wire is inserted in between the two metal blades on a punch down block and the punch down tool is pressed down on top of the wire and the two blades on the punch down block. Many punch-down tools have a spring-loaded impact mechanism which delivers a measured impact blow to the termination blade when the operator applies longitudinal pressure on the handle. This requires a bit of pressure until, with an audible snap, the wire is stripped and contact made as it is pushed down between the two punch down block blades.

There are two common types of blocks—66 blocks and 110 blocks, and each requires different types of blades. Bix and Krone blocks and blades are also common. Some punch down tools have the blade fixed in the punch down tool, whereas others have a standard-form cavity for use with standard-form blades. Blades are often double-ended, with one end being 66 blocks style and the other end being 110 blocks style. Thus, the standard-form cavity is typically double-depth to allow for double-ended blades. Most modern punch down tools have a hollow interior on the butt end of the tool to allow storage of another blade. This storage space can be utilized to store both 66 blocks style and 110 blocks style blades.

Because a punch down tool is required for almost any well-equipped telephone lineman or network technician, a variety of punch down tools have become available. To improve efficiency and reduce service overhead, it is generally desirable to integrate as many functions as possible in a given piece of service equipment. Thus, in some variations (e.g., the Harris D914), the punch down tool can be used with a screwdriver adapter in place of a blade so that the punch down tool can be used as a screwdriver. In order to accommodate the rotational (torque) function of driving a screw, the punch down tool and the screwdriver adapters are specially designed to mate together while allowing the handle to continue to be useful as a punch down tool. The Harris D914 has become so popular that other manufacturers (e.g., Fluke Networks) sell compatible tools with the same model designation. For example, from Fluke Networks is the Model 10051-300, a ¼" square driver hex bit adapter which allows a Harris D914 punch down tool to be used with ¼" square drive sockets.

DESCRIPTION OF THE DRAWINGS

FIG. 4 is a schematic representation of an aspect of the invention.

In all of the drawings, a forward end or direction is to the left and the rearward end or direction is to the right.

DETAILED DESCRIPTION

Despite the advantages of providing a punch down tool with multiple capabilities, there have been virtually no improvements in about fifteen years. This is not due to a lack of market for punch down tools, absence of technology, or limits on materials. Rather, it is has been due to a lack of creativity on the part of tool designers.

Figure 1:
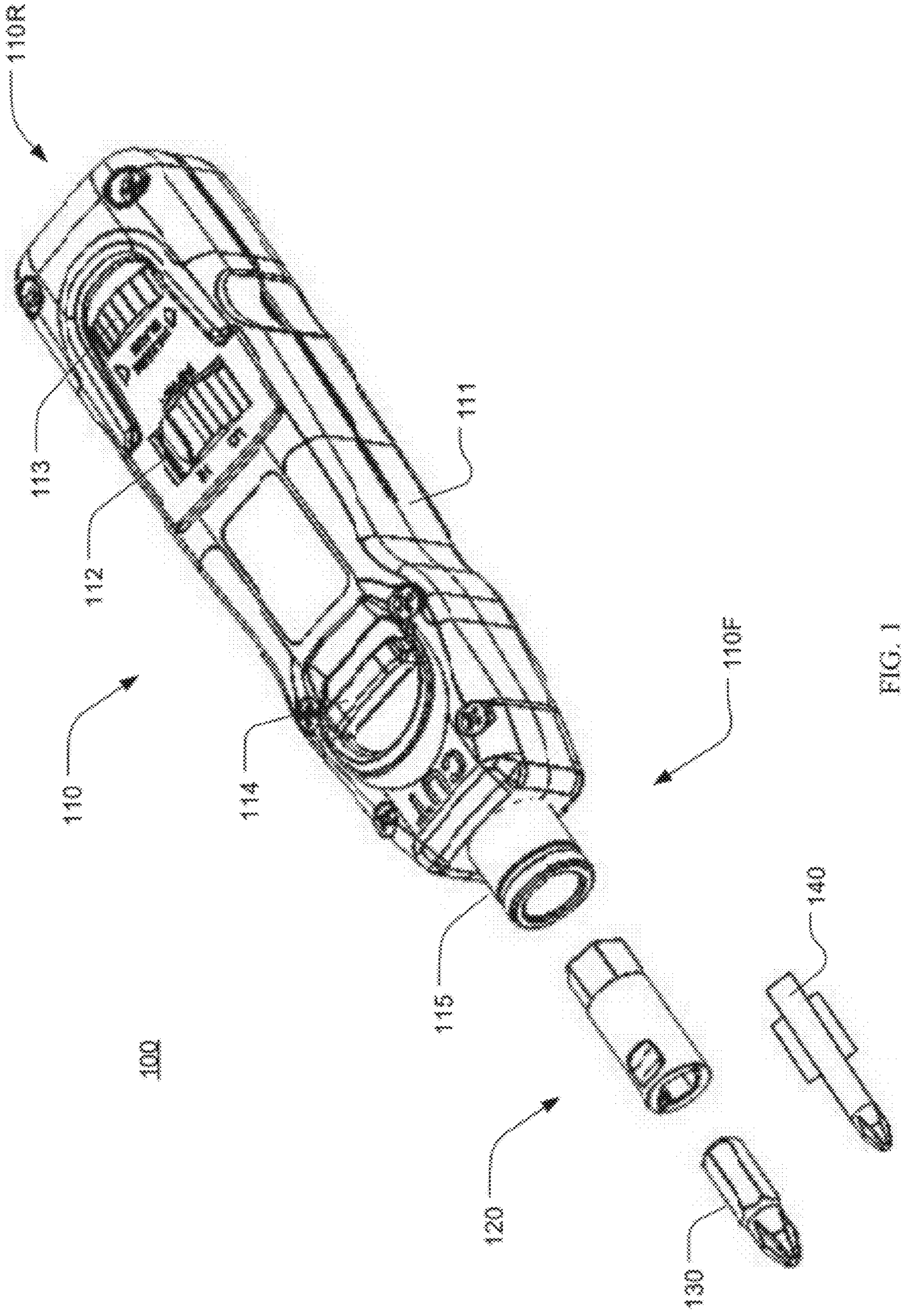
FIG. 1 is an exploded perspective view of a tool system.

Referring now to FIG. 1 there is shown an exploded perspective view of a tool system 100. The tool system may include a punch down tool 110, a work end adapter 120, a hex bit 130 and/or a winged bit 140. The relative position of various parts of the tool system 100 will be described based upon this view. For example, terms such as top, bottom, left and right are used. However, the tool system 100 may be used in various positions such as upside down. Thus, some descriptive terms are used in relative terms and not absolute terms.

The punch down tool 110 has a first tool portion 110F and a second tool portion 110R. The punch down tool may include an elongate body 111 formed into a hand grip—that is, graspable by a normal human hand. The elongate body 111 may be made from high impact plastic or other rigid, rugged materials. A receiver 115 is shown coupled to the first tool portion 110F of the punch down tool 110. The receiver 115 may be adapted to receive standard 66 blocks, 100 blocks, and/or Bix and Krone blades, either single-ended or double-ended. The receiver may be made from hardened steel or other strong, rigid materials.

The punch down tool 110 may include a hammer assembly 116 (shown in FIG. 4) for delivering an impact to the receiver 115. The punch down tool 110 may include an impact adjustment switch 112 to adjust the impact force, for example between a high and low setting. The punch down tool 110 may include a lockout 114 to prevent the hammer assembly from delivering the impact, and therefore to provide longitudinal rigidity to the hammer assembly, which is particularly advantageous for when the tool system 100 is used as a screwdriver.

The lockout 114 may be a flat rigid member having a central hole (not shown). The lockout 114 may be engaged with lateral pressure in one direction and disengaged with lateral pressure in the opposite direction. When engaged, the central hole is off-center of the hammer assembly and thereby prevents the hammer assembly from movement. When disengaged, the lockout 114 may allow the hammer assembly free movement through the central hole.

The punch down tool 110 may include a blade storage cavity (shown in FIG. 4) in the second tool portion 110R. A blade release switch 113 is configured to allow the user to open the cavity for insertion or release of a blade.

The hex bit 130 and the winged bit 140 may have standard configurations and may be Philips screwdriver, bladed screwdriver, hex, torx, square driver, socket, or other ends.

The work end adapter 120 is provided to allow the punch down tool 110 to be used with hex bits and winged bits. Accordingly, the work end adapter 120 fits into the receiver 115, and bits such as the hex bit 130 and the winged bit 140 may be inserted into the work end adapter 120. This provides the punch down tool 110 with numerous functionalities. The work end adapter 120 may be made from hardened steel or other materials, and may be cast and/or machined into shape.

The work end adapter 120 or the punch down tool 110 may include a ratchet gear assembly to allow rotational ratcheting of the tool system 100. Fastening using the bit attachments is made easier and faster with the ratchet gear assembly, which allows rotational fastening without removing and re-engaging the bits.

Figure 2A:
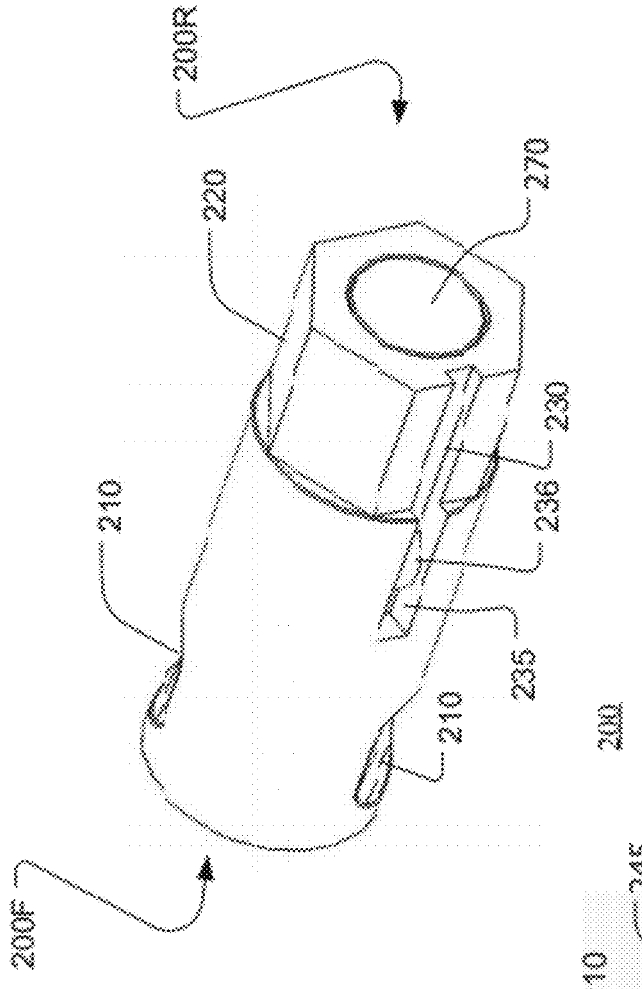
FIG. 2A is a perspective view of a work end adapter.

Referring now to FIG. 2A there is shown a perspective view of a work end adapter 200 which may be the work end adapter 120. The work end adapter 200 may have a rigid elongate body having a first adapter portion 200F and a second adapter portion 200R.

The work end adapter 200 may be generally cylindrical in shape, with a constant diameter $d_w$. The second adapter portion 200R may have a male coupling 220.

The coupling 220 may have a hexagonal male head having a largest diameter equal to $d_w$. Other non-circular cross-section shapes may be used, such as regular polygons, irregular polygons, and irregular shapes. The shape and size of the coupling 220 may be selected such that when the work end adapter 200 is properly inserted in a complementary coupling of a receiver, the work end adapter 200 will not rotate with respect to the receiver. The coupling 220 may not be a male end. For example, the work end adapter may have a female coupling, and the receiver provided with a complementary male coupling. Alternatively, the couplings may be male/female hybrids or some other form which allows a good, secure fit over repeated use. The couplings may provide retention of the work end adapter in the receiver, prevent rotation of the work adapter relative to the receiver, and proper orientation of the work end adapter in the receiver. The second adapter portion of the work end adapter may be non-circular and therefore not allow the work end adapter to rotate when coupled to the receiver. In this regard, the second adapter portion may be generally circular but have one or more features which prevent rotation, such as a generally flat surface. In this patent, such a configuration is considered to be non-circular.

The second adapter portion 200R may further include a groove 230 having a depth $d_g$ extending along the outer surface of the second adapter portion 200R. The groove may have a substantially constant shape and size along its length. In FIG. 2A, the groove generally extends along the longitudinal direction of the work end adapter from the end of the second adapter portion to a distance toward the front of the work end adapter. The groove 230 may include a detent portion 235 having a depth $d_d$. The detent portion 235 may be the end of the groove 230 and defined by a bump 236. Alternatively, the detent portion 235 may be in the form of a depression in the groove 230.

The first adapter portion 200F may be provided with finger grips 210. The finger grips 210 may provide a user with a place for easier holding on the first adapter portion 200F during insertion and/or removal of the work end adapter 200 from a receiver, and during insertion and/or removal of bits from the work end adapter 200.

Figure 2B:
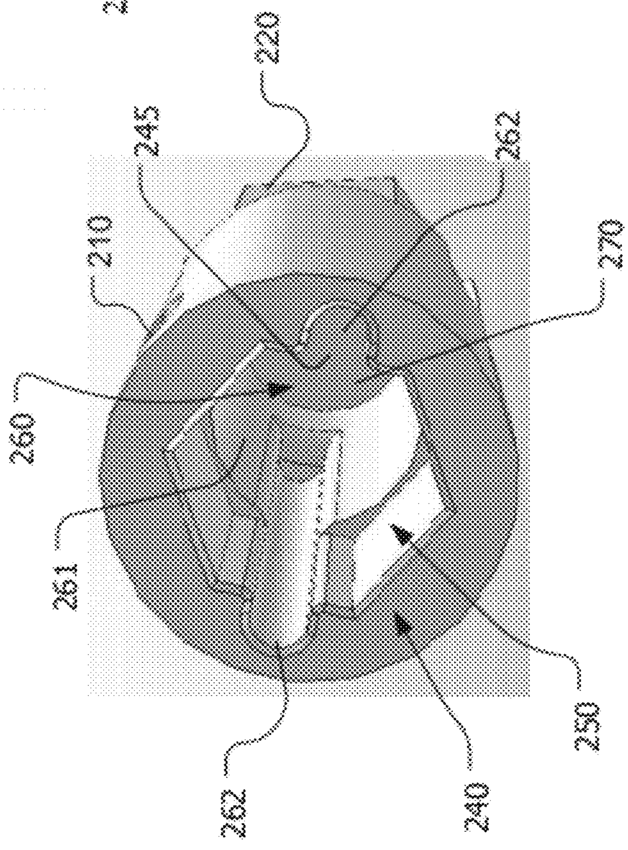
FIG. 2B is a perspective view of a first portion of the work end adapter.

Referring now to FIG. 2B, a perspective view of the first adapter portion 200F is shown. The first adapter portion 200F has an adapter opening 240 for receiving and holding bits. The adapter opening 240 may include a first cavity 250 which may be at least partially concentric with a second cavity 260, and having collinear longitudinal axes.

The first cavity 250 may be adapted to matingly receive hexagonal bits and accordingly may have a hexagonal cross-section and a depth sufficient for hexagonal bits.

The second cavity 260 may be adapted to matingly receive winged shaft bits and accordingly have a central section 261 with a circular cross-section and two opposing slots 262. Because in a winged bit the shaft typically extends well beyond the wings, the central section 261 may extend beyond the ears to a depth substantially at the bottom 245 of the adapter opening 240. The slots 262 may extend from the surface of the first adapter portion to a depth above the bottom 245 of the adapter opening 240.

The adapter opening 240 has a bottom 245 that may include a magnet 270 fitted snugly into the body of the work end adapter 200. The magnet 270 may provide a magnetic field which may be useful for holding parts to the bits inserted into the adapter opening 240. Alternatively, the adapter opening 240 may be closed or may extend through the length of the work end adapter 200 from the first adapter portion 200F to the second adapter portion 200R.

Figure 3:
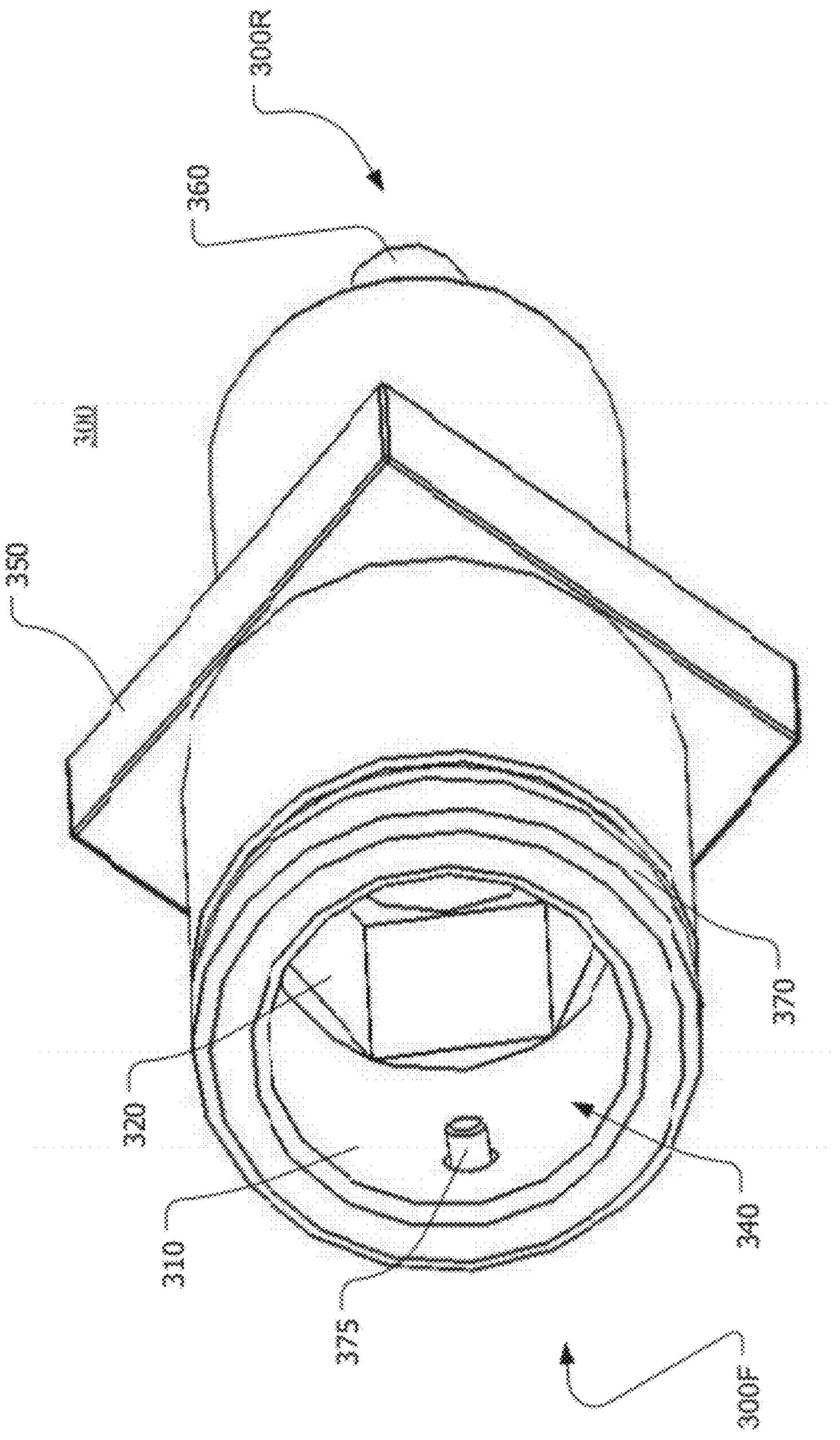
FIG. 3 is a perspective view of a receiver.

Referring now to FIG. 3 there is shown a perspective view of a receiver 300 for a punch down tool, which may be the receiver 115 of the punch down tool 110 (FIG. 1).

The receiver 300 may have a rigid elongate body having a forward end 300F and a rearward end 300R. The receiver 300 has an opening disposed forward-most of the receiver 300. The opening may have a circular cross-section and be sized appropriately to accommodate standard blades. The receiver opening 340 may extend into the receiver's body toward the rearward end 300R. The receiver opening 340 may have a cross-sectional shape and depth sufficient to accommodate standard double-ended blades. The receiver opening 340 has a first aperture 310 which may be round and have a 3/8" diameter.

The receiver opening 340 may include a second aperture having a female coupling 320 complementary to the coupling of a work end adapter. For example, to complement the hexagonal coupling 220 of the work end adapter 200, the coupling 320 may be a socket having a hexagonal cross-section which is the same size as the coupling 220, but just slightly larger to allow for ease of insertion and removal. On the other hand, if the work end adapter has a female coupling, then the receiver should have a complementary male coupling.

The receiver 300 may have a pin 375 protruding diametrically into the receiver opening 340. The pin may be a short, thin section of wire which normally extends a distance $d_p$ into the cavity 340, where $d_p > d_g$. Also, $d_p$ may be less than $d_d$. The pin 375 on the receiver 300 and the groove 230 on the work end adapter 200 are complementary, such that they engage when the work end adapter 200 is moved into the receiver 300. The pin 375 may be biased into the receiver opening 340, but may be at least partially movable out of the receiver opening 340 during insertion of the work end adapter 200 into the receiver 300. The pin 375 may cooperate with the groove 230 on the work end adapter 200. The detent portion 235 in the groove 230 may be positioned so that the pin 375 can drop into the detent portion 235 when the work end adapter 200 is properly seated into the receiver 300. Furthermore, the size, shape and location of the pin 375 and the detent portion 235 may be selected to also require some extra force to remove the work end adapter 200 from the receiver 300, such as an amount of force greater than in normal use of the tool system 100, but small enough that a user can conveniently pull the work end adapter 200 from the receiver 300 without special tools. To provide these various forces on the pin 375, the pin 375 may be an end of a C-spring 370 disposed around the outside of the receiver 300 and spaced some distance back from the opening. The end of the C-spring 370 may extend from the outside of the receiver 300 into the receiver opening 340 through a hole in the receiver.

The receiver 300 may further include a central portion 350. The central portion 350 may have a square cross section for secure installation into the body of the punch down tool, and a back face (hidden in FIG. 3) against which a spring of the hammer assembly may press.

The rearward end 300R may have a portion 360 having a reduced diameter which rests against the hammer assembly's hammer.

Figure 5:
FIG. 5 is a schematic representation of another aspect of the invention.

The receiver may have a magnet 380 (shown in FIG. 5) as an alternative or in addition to the magnet 270 of the work end adapter 200. However, it may be better to have the magnet in the work end adapter 200, since it may be undesirable to introduce magnetic fields when working with blades.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments. As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An apparatus comprising:

a work end adapter comprising a body with a first adapter portion and a second adapter portion;

the first adapter portion comprising an adapter opening, the first adapter portion comprising a first cavity with a hexagonal cross-section and extending from the adapter opening into the body to a first depth, the first cavity configured to receive hexagonal bits;

the first adapter portion further comprising a second cavity extending from the adapter opening into the body to a second depth greater than the first depth;

the first adapter portion further comprising two opposing slots extending from the adapter opening into the body to a depth between the first depth and the second depth, the two opposing slots configured to receive finned shaft bits;

the second adapter portion comprising a groove extending in a longitudinal direction of the work end adapter along the second adapter portion.

2. The apparatus of claim 1, wherein the second adapter portion further comprises a first coupling having a non-circular cross-section.

3. The apparatus of claim 2, wherein the groove is on an outside of the work end adapter.

4. The apparatus of claim 2, further comprising:

a punch down tool having a first tool portion and a second tool portion, the punch down tool comprising:

an elongate body on the second tool portion;

a receiver on the first tool portion, the receiver comprising a receiver opening at an end, the receiver comprising:

a first aperture having a generally circular cross-section and extending from the receiver opening to a first depth;

a second aperture comprising a second coupling that is complementary to the first coupling of the work end adapter; and a pin protruding diametrically into the first aperture, wherein the pin and the groove of the work end adapter are configured to engage when the work end adapter is coupled to the receiver, and wherein the pin is biased into the first aperture and movable at least partially out of the first aperture during insertion of the work end adapter into the receiver.

5. The apparatus of claim 4, the punch down tool further comprising:

a hammer assembly for delivering an impact to the receiver; and a lockout to prevent the hammer assembly from delivering the impact.

6. The apparatus of claim 4, further comprising a C-spring on an outside of the receiver around the receiver opening, wherein a portion of the C-spring extends through a hole in the receiver to comprise the pin.

7. The apparatus of claim 4, wherein the receiver further comprises a magnet.

8. The apparatus of claim 4, wherein the second coupling comprises a hexagonal socket.

9. The apparatus of claim 4, wherein the first coupling comprises a head having a polygonal cross-section and the second coupling comprises a complementary polygonal socket.

10. The apparatus of claim 1, wherein the second adapter portion comprises a detent disposed in a portion of the groove.

11. The apparatus of claim 1, wherein the first cavity and the second cavity of the first adapter portion of the work end adapter are aligned.

12. The apparatus of claim 1, wherein the work end adapter further comprises a magnet.

13. A punch down tool system comprising:

the apparatus of claim 1;

a punch down tool having a first tool portion and a second tool portion, the punch down tool comprising:

a receiver on the first tool portion for receiving the work end adapter, the receiver comprising a receiver opening at an end thereof, the receiver comprising:

a first aperture extending into the receiver from the receiver opening and having a generally circular cross-section;

a pin protruding diametrically into the first aperture, wherein the pin is biased into the first aperture and is movable at least partially out of the first aperture;

an elongate body on the second tool portion;

a hammer assembly for delivering an impact to the receiver; and a lockout to prevent the hammer assembly from delivering the impact.

14. The punch down tool of claim 13, wherein the receiver further comprises a second aperture that is non-circular and that extends into the receiver from the receiver opening.

15. The punch down tool of claim 14, wherein the first aperture of the receiver opening and the second aperture of the receiver opening are aligned.

16. The punch down tool of claim 15, wherein the second aperture comprises a hexagonal socket.

17. The punch down tool of claim 13, wherein the groove is adapted to engage the pin when the work end adapter is inserted into the receiver.

18. The punch down tool of claim 17, wherein the work end adapter further comprises a magnet.

19. The punch down tool of claim 13, further comprising a C-spring on the outside of the receiver around the receiver opening, wherein a portion of the C-spring extends through a hole in the receiver to comprise the pin.

20. The punch down tool of claim 13, wherein the receiver further comprises a magnet.

* * * * *